(12) United States Patent
Yoshizawa (10) Patent No.: US 7,741,243 B2
(45) Date of Patent: Jun. 22, 2010

(54) PRODUCTION METHOD OF CATALYST LAYER

(75) Inventor: Atsuhito Yoshizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/244,651

(22) Filed: Oct. 2, 2008

(65) Prior Publication Data

US 2009/0099015 A1 Apr. 16, 2009

(30) Foreign Application Priority Data

Oct. 5, 2007 (JP) .............................. 2007/262421

(51) Int. Cl.
*B01J 23/00* (2006.01)
*B01J 21/00* (2006.01)
*B01J 20/00* (2006.01)

(52) U.S. Cl. ................... 502/339; 502/326; 502/327; 502/334; 502/527.12; 502/527.13

(58) Field of Classification Search ................ 502/300, 502/326, 327, 334, 339, 527.12, 527.13; 429/30, 40, 44

See application file for complete search history.

(56) References Cited

U.S. PATENT DOCUMENTS

| | | | | |
|---|---|---|---|---|
| 5,334,570 A * | 8/1994 | Beauseigneur et al. | ...... | 502/304 |
| 6,849,999 B1 * | 2/2005 | Kobayashi et al. | .......... | 313/495 |
| 6,866,958 B2 * | 3/2005 | Vyas et al. | .................... | 429/38 |
| 6,962,613 B2 * | 11/2005 | Jenson | ...................... | 29/623.5 |
| 7,112,550 B2 * | 9/2006 | Hiramoto et al. | ............. | 502/64 |
| 7,131,189 B2 * | 11/2006 | Jenson | ......................... | 29/730 |
| 7,158,708 B2 * | 1/2007 | Peret | ........................... | 385/128 |
| 7,172,822 B2 * | 2/2007 | Shibata | ........................ | 428/690 |
| 2002/0004455 A1 * | 1/2002 | Nakanishi et al. | ........... | 502/439 |
| 2002/0144394 A1 * | 10/2002 | Uchida et al. | .............. | 29/623.5 |
| 2003/0087145 A1 | 5/2003 | Yasumoto et al. | ............. | 429/44 |
| 2003/0176280 A1 * | 9/2003 | Caze et al. | ................... | 502/439 |
| 2003/0181316 A1 * | 9/2003 | Hiramoto et al. | ............. | 502/64 |
| 2003/0224559 A1 * | 12/2003 | Gross | ......................... | 438/128 |
| 2004/0038801 A1 * | 2/2004 | Kikuchi | ......................... | 502/4 |
| 2004/0087443 A1 * | 5/2004 | Tamura | ..................... | 502/439 |
| 2005/0158607 A1 * | 7/2005 | Vyas et al. | .................... | 429/34 |
| 2005/0170958 A1 * | 8/2005 | Kikuchi et al. | ............. | 502/439 |
| 2007/0087935 A1 * | 4/2007 | Kim et al. | ................... | 502/439 |
| 2007/0212591 A1 | 9/2007 | Miyazaki et al. | ............. | 429/40 |
| 2007/0243452 A1 * | 10/2007 | Weidman et al. | ............. | 429/44 |
| 2008/0057213 A1 * | 3/2008 | Wortman et al. | ............ | 427/448 |
| 2008/0075942 A1 * | 3/2008 | Gerard et al. | ............ | 428/292.1 |
| 2009/0072231 A1 * | 3/2009 | Tao et al. | ....................... | 257/43 |
| 2009/0312179 A1 * | 12/2009 | Chettouf et al. | ............. | 502/242 |

FOREIGN PATENT DOCUMENTS

| | | |
|---|---|---|
| JP | 2002-270187 | 9/2002 |
| JP | 2006-049278 | 2/2006 |
| WO | WO 2006/004023 A1 | 1/2006 |

* cited by examiner

*Primary Examiner*—Cam N Nguyen
(74) *Attorney, Agent, or Firm*—Fitzpatrick, Cella, Harper & Scinto (57) ABSTRACT

Provided is a production method of a catalyst layer which is improved in catalyst activity and catalyst utilization efficiency. The method of producing a catalyst layer includes the steps of forming a first layer including a catalyst precursor on a substrate by a vapor phase process; forming cracks in the first layer; and reducing the first layer having the cracks formed therein.

6 Claims, 10 Drawing Sheets

PRODUCTION METHOD OF CATALYST LAYER

BACKGROUND OF THE INVENTION

1. Field of the Invention

The present invention relates to a production method of a catalyst layer.

2. Description of the Related Art

Hitherto, there has been made such an attempt to increase the surface area of a catalyst so as to enhance the utilization efficiency of the catalyst by providing fine particles of the catalyst and three-dimensionally dispersing the fine particles by having them carried by carbon particles or the like. Meanwhile, there have been also made such attempts to improve substance transport in a catalyst layer by forming the catalyst layer into an extremely thin layer such as of about several μm, and to increase the effective area of the catalyst by concentrating the catalyst layer in the vicinity of an electrolyte membrane. In particular, in a case of mounting a fuel cell to a small-sized electrical equipment, size reduction of the fuel cell itself is also required. For that reason, a system (air breathing system) of supplying air from air holes to an air electrode by natural diffusion without using a pump or a blower has been employed in many cases. In such air supply system, there are many cases where substance transport at an air electrode becomes a reaction rate-determining factor, and it is therefore considered that reducing the thickness of the catalyst layer is effective means for improving the reaction rate.

To deal with this, as a thin film formation means, a vapor deposition method such as sputtering is effectively used. In Japanese Patent Application Laid-Open No. 2006-049278, there is disclosed a production method of a thin film catalyst layer having a large specific surface area and high activity using a sputtering process.

Besides, there is generally known that it is preferred that in order to increase the utilization efficiency of a catalyst, the catalyst layer has an appropriate amount of fine pores or cracks. Japanese Patent Application Laid-Open No. 2002-270187 discloses a method of providing cracks in a catalyst layer by controlling drying conditions of a catalyst slurry and controlling the cracks.

However, in the catalyst layer produced by the method described in Japanese Patent Application Laid-Open No. 2006-049278, there is formed an extremely dense region in such a thickness as about 100 nm to 200 nm at an initial stage of the formation of the catalyst layer. For that reason, in a case of forming a membrane electrode assembly (MEA) by a transfer process, or in a case of forming a catalyst layer directly on a gas diffusion layer, since the dense region is formed on the gas diffusion layer side, it has been required to improve gas diffusion ability and water discharge ability, to thereby enhance the utilization efficiency of the catalyst.

Further, the method of forming fine pores or cracks in the catalyst layer described in Japanese Patent Application Laid-Open No. 2002-270187 includes making a powder catalyst into a slurry and producing cracks in a drying process of the slurry. For that reason, the method can not be applied to the catalyst layer formed by the dry method of a vapor phase as described in Japanese Patent Application Laid-Open No. 2006-049278. Therefore, there has been not known a method of forming cracks in the catalyst layer such as described in Japanese Patent Application Laid-Open No. 2006-049278.

SUMMARY OF THE INVENTION

The present invention has been accomplished in view of the above-mentioned problems, and it is, therefore, an object of the present invention to provide a production method of a catalyst layer which is improved in catalyst activity and catalyst utilization efficiency.

According to an aspect of the present invention, there is provided a method of producing a catalyst layer, which includes the steps of: forming a first layer including a catalyst precursor on a substrate by a vapor phase process; forming cracks in the first layer; and reducing the first layer having the cracks formed therein.

According to the present invention, there can be provided a production method of a catalyst layer, which attains a high catalyst activity and a high catalyst utilization efficiency.

Further features of the present invention will become apparent from the following description of exemplary embodiments with reference to the attached drawings.

DESCRIPTION OF THE EMBODIMENTS

Hereinafter, the present invention is described in detail.

Now, by referring to the accompanying drawings, detailed description is made of a method of producing a catalyst layer of a polymer electrolyte fuel cell, as an example of a production method of a catalyst layer, by way of exemplary embodiment of the present invention. It is be noted that materials, sizes, shapes, relative disposition, and the like of constituent members described in the embodiments of the present invention do not limit the scope of the present invention thereto unless otherwise noted specifically. Similarly, the production method described below is not a sole method of producing the catalyst layer of the present invention.

The present invention provides a method of producing a catalyst layer, which includes the steps of:
(1) forming a first layer including a catalyst precursor on a substrate by a vapor phase process;
(2) forming cracks in the first layer; and
(3) reducing the first layer having the cracks formed therein.

As to step (1)

In the step (1), a first layer including a catalyst precursor is formed by a vapor phase process. The first layer is a layer formed at an initial stage of forming the catalyst precursor by the vapor phase process, and the first layer is a region (dense region) which is formed in such a thickness as 100 nm or less, or 200 nm or less at the initial stage of the formation and in which the catalyst precursor exists densely. Examples of the vapor phase process for forming the first layer include a reaction vapor deposition process and a reactive sputtering process. Of those, it is preferred to employ the reactive sputtering process. By the employment of the reactive sputtering method, the first layer can be formed so as to have a dendritic structure, thereby increasing the specific surface area. Incidentally, the term "dendritic structure" herein employed refers to a structure in which a flake-shaped (flaky) substructures constituted by aggregation of particles having a diameter of 10 nm or less are gathered in a large number while having branch points. It is preferred that the length in lateral direction of one of the flaky substructures is 5 nm or more and 200 nm or less. Incidentally, the term "length in lateral direction" herein employed refers to a smallest dimension within a plane of one flake.

Further, it is preferred that the porosity of the dendritic structure is 30% or more and less than 90%, more preferably 55% or more and 75% or less. Incidentally, the term "porosity" herein employed means [1-(actual volume of catalyst with dendritic structure)/(volume of space between polymer electrolyte membrane and catalyst support)].

Incidentally, the catalyst precursor contained in the first layer becomes a catalyst having catalyst activity which is sufficient to function as a catalyst of a fuel cell by the reduction step (3) described below. Examples of such a catalyst precursor include platinum oxide or a composite oxide of platinum oxide and metal element(s) except platinum. As examples of the other metal elements, there are included transition metal elements such as cobalt, copper, and iron, and noble metal elements such as ruthenium and iridium. Further, the catalyst precursor may contain titanium oxide, niobium oxide, or the like.

It is preferred that the thickness of the first layer is 1 µm or less. The reason is that in the step (2), in a case where the first layer has a thickness exceeding 1 µm, the ratio of the dense region which is formed at the initial stage of the formation and has a thickness within a range of 100 nm or less or 200 nm or less and in which an internal stress is remarkably generated, with respect to the entirety of the first layer decreases, so that when forming cracks in the step (2), the internal stress is absorbed by the entire layer, whereby the cracks can be hardly formed. Further, in a case where the first layer is formed by the vapor phase process in the step (1), and subsequently cracks are formed by cooling in the step (2), it is preferred to form the first layer in a thickness of 500 nm or more. The reason is that when the first layer is formed in a thickness of less than 500 nm in such a case, since the time period for the formation of the catalyst precursor layer is short, the temperature of the catalyst precursor layer does not rise sufficiently, with the result that cracks may not be formed even when cooled. In addition, in a case where cracks are formed by etching in the step (2), it is preferred that the thickness of the first layer is 200 nm or less. The reason is that if the catalyst precursor with a dendritic structure is once formed subsequently to the formation of the dense region having a thickness of 100 nm or less or 200 nm or less at the initial stage, there are cases where the dense region may not be etched.

Incidentally, as the substrate, a substrate for transfer may be used on the premise that the first layer is transferred onto the polymer electrolyte membrane later, or a gas diffusion layer may be used. In a case where a gas diffusion layer is used as the substrate, the first layer is formed directly on the gas diffusion layer by the vapor phase process. In the former case, as the substrate, a polytetrafluoroethylene (PTFE) sheet or the like can be used. Further, in the latter case, materials described later, which can be used as the gas diffusion layer, can also be used as the substrate.

As to step (2)

In the step (2), cracks are formed in (or on) the first layer formed in the step (1).

Incidentally, the term "crack" herein employed refers to a recess having a width of 1 µm or more, and in this case, the term "width" refers to a length in lateral direction of the recess. Incidentally, because the crack is defined as described above, it is needless to say that a groove which is a recess having a width of 1 µm or more, and a length of 5 µm or more and a hole which is a recess having a diameter of 1 µm or more are included in the concept of the crack. At this time, the term "length" refers to a length in a longitudinal direction of the recess.

As a method of forming cracks in the first layer, there are included an etching process and a cooling process. Incidentally, as the method of forming cracks, etching or cooling may be used alone or etching and cooling may be used in combination. As the etching process, for example, Ar etching may be used. Through holes may be formed in the first layer by Ar etching. Further, when conducting the cooling, the cooling may be conducted forcedly. However, natural cooling may be conducted, which involves leaving the first layer, which became a high temperature state (70° C., for example) through the formation of the first layer by the vapor phase process in the step (1), at room temperature (generally 25° C.) to cool the first layer down to room temperature. At this time, when conducting the cooling, it is preferred to reduce the temperature by 40° C. or more. In addition, it is preferred to set the cooling termination temperature to room temperature.

Accordingly, it is preferred to cool from a temperature of 70° C. or more to ambient temperature (20° C. to 30° C.). Thereby, an internal stress generates inside the first layer, so that cracks can be formed in the dense region of the catalyst precursor.

As to step (3)

In the step (3), the first layer in which the cracks are formed in the step (2) is reduced. By reducing the first layer in the state where the cracks are formed therein, volume shrinkage of the first layer due to the reduction occurs, and the cracks formed in the step (2) are grown, so that larger cracks are formed in a large number. Incidentally, in a case where the first layer formed in the step (1) has a thickness of 1 µm or less, it is preferred that after the formation of the cracks in the step (2) and before the step (3), a second layer including a catalyst or a catalyst precursor is formed on the surface of the first layer having the cracks formed therein. The reason is that in a case where the thus obtained catalyst layer is allowed to function as a catalyst layer for a fuel cell, although the thickness of the catalyst layer is preferably about 2 µm, if the thickness of the first layer is more than 1 µm, there are cases where cracks are difficult to be generated in the step (2). Accordingly, in the case where the thickness of the first layer is 1 µm or less, it is preferred that a second layer including a catalyst or a catalyst precursor is formed after the formation of the cracks in the step (2). At this time, in a case where the second layer is formed of a catalyst precursor, it is preferred to form the second layer prior to the step (3). This is because, with this order, the reduction treatments of the first layer and the second layer may be performed at the same time. Incidentally, in a case where the second layer is formed of a catalyst, since the second layer does not need to be reduced, the formation of the second layer may be performed either before or after the step (3).

Further, the second layer may be formed of either a catalyst or a catalyst precursor. In a case where the second layer is formed of a catalyst precursor, the catalyst precursor constituting the second layer is subjected to a reduction treatment together with the first layer in the step (3). In such a case, as the catalyst precursor which constitutes the second layer, there are included platinum oxide and a composite oxide of platinum oxide and metal element(s) except platinum as is the case with the first layer. Of those, platinum oxide having a dendritic structure is preferably used. Incidentally, it is preferred that the catalyst precursor constituting the second layer and the catalyst precursor constituting the first layer are the same compound. In a case where both the first layer and the second layer are constituted of platinum oxide having a dendritic structure, the obtained catalyst layer will be constituted of platinum having a dendritic structure. Besides, in a case where the second layer is constituted of a catalyst precursor, as a method of forming the second layer, there may be employed a vapor phase process as with the first layer, or a non-contact coating process such as a spray coating.

Besides, in a case where the second layer is constituted of a catalyst precursor, cracks may be formed in the second layer by following the same procedure as in the step (1), prior to the subsequent step (3). At this time, a third layer including a catalyst precursor or a catalyst may be formed on the surface of the second layer having the cracks formed therein.

In a case where the second layer is constituted of a catalyst, as the catalyst constituting the second layer, for example, platinum-carrying carbon or platinum black may be used. As the method of forming the second layer described above, there is included a non-contact coating such as a spray coating.

It is preferred that the thickness of the second layer is within a range of 500 nm or more and 1.5 µm or less.

Incidentally, in a case where the first layer, or the first layer and the second layer are formed on a substrate for transfer, it is preferred to perform transfer to a polymer electrolyte membrane before the step (3) (if only the first layer is formed, the transfer is preferably performed between the step (2) and the step (3), and if the first layer and the second layer are formed, the transfer is preferably performed between the step of forming the second layer and the step (3)).

Figure 1:
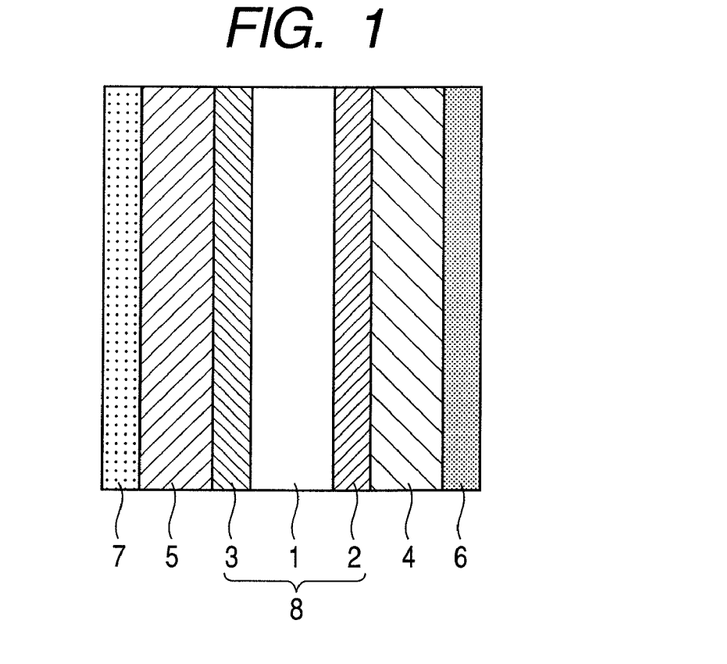
FIG. 1 is a schematic diagram illustrating a cross-sectional structure of an example of a polymer electrolyte fuel cell using a catalyst layer of the present invention.

Next, description is made of a fuel cell produced using a catalyst layer obtained by the present invention with reference to FIG. 1.

FIG. 1 is a schematic diagram illustrating a cross-sectional structure of a single fuel cell unit of a polymer electrolyte fuel cell using a catalyst layer of the present invention. In FIG. 1, the single fuel cell unit includes a polymer electrolyte membrane 1, a pair of catalyst layers 2 and 3 (cathode (air electrode) side catalyst layer 2 and anode (fuel electrode) side catalyst layer 3) each being disposed in contact with the polymer electrolyte membrane 1, a cathode side gas diffusion layer 4 disposed in contact with the cathode side catalyst layer 2, an anode side gas diffusion layer 5 disposed in contact with the anode side catalyst layer 3. Further, the fuel cell unit includes a cathode side current collector 6 disposed in contact with the cathode side gas diffusion layer 4, and an anode side current collector 7 disposed in contact with the anode side gas diffusion layer 5. Further, the single fuel cell unit includes a membrane electrode assembly 8 formed of the polymer electrolyte membrane 1, the cathode side catalyst layer 2, and the anode side catalyst layer 3.

Incidentally, although the following description is made by taking as an example a fuel cell in which a catalyst layer produced by the production method of the present invention is disposed as the cathode side catalyst layer (layer 2 in FIG. 1), the catalyst layer of the present invention is not limited to the catalyst layer for the fuel cell. Further, the disposition and structure of the catalyst layer for the fuel cell is not also limited thereto. For example, there may be employed a structure in which the both electrodes (cathode side catalyst layer 2 and anode side catalyst layer 3 in FIG. 1) are formed of the catalyst layer produced according to the present invention, or a structure in which only the anode side catalyst layer 3 is formed of the catalyst layer produced according to the present invention. Incidentally, in either case, the catalyst layer is disposed such that the dense region of the first layer having cracks formed therein is located on the gas diffusion layer side.

Now, respective components constituting the fuel cell are described.

The polymer electrolyte membrane 1 has a function of transmitting protons ($H^+$) generated on the anode side to the cathode side. Further, in a case where protons move in the polymer electrolyte membrane 1 toward the cathode side, since the protons moves by utilizing water molecules as a medium, the polymer electrolyte membrane 1 also has a function of holding water molecules.

As the polymer electrolyte membrane 1 having such functions, a polymer electrolyte membrane having proton conductivity can be used. As examples of the polymer electrolyte membrane 1, a perfluorosulfonic acid polymer having a structure in which a side chain having a sulfonic group at a terminal end thereof is bonded to Teflon (registered trademark) skeleton, a block polymer including a hydrophilic block and a hydrophobic block, or the like can be suitably used.

As an example of the perfluorosulfonic acid polymer, there is included Nafion (registered trademark), or the like.

The anode side gas diffusion layer 5 and the cathode side gas diffusion layer 4 are fuel cell constituting members having functions of gas diffusion, water penetration, moisturization, current collection, and the like. Specifically, those members are required to satisfy the following: in order to efficiently conduct the electrode reaction, a fuel gas or an oxidizer gas needs to be supplied to a reaction region of the catalyst uniformly and sufficiently; excess reaction product water needs to be discharged from the catalyst layer efficiently; drying of the electrolyte membrane needs to be prevented; and electric charge generated by the electrode reaction can be effectively taken out to outside of the fuel cell unit.

Figure 2:
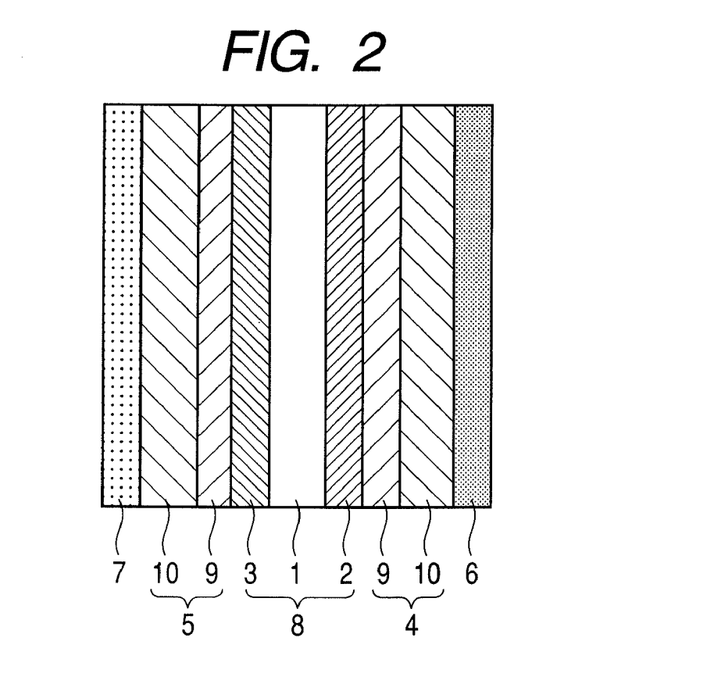
FIG. 2 is a schematic diagram illustrating a cross-sectional structure of another example of a polymer electrolyte fuel cell using a catalyst layer of the present invention.

It is preferred that the anode side gas diffusion layer 5 and the cathode side gas diffusion layer 4 are each constituted of a plurality of sub-layers so as to satisfy these functions. In a case of constituting each of the diffusion layers by the plurality of sub-layers, it is preferred that of the sub-layers possessed by each of the anode side gas diffusion layer 5 and the cathode side gas diffusion layer 4, the sub-layer which is into contact with the membrane electrode assembly 8 has an average pore diameter which is smaller than those of the other sub-layers. Specifically, in a case where the gas diffusion layer is constituted of two sub-layers, as illustrated in FIG. 2, it is preferred that the average pore diameter of the sub-layers 9, which is in contact with the membrane electrode assembly 8, of the anode side gas diffusion layer 5 and the cathode side gas diffusion layer 4, is smaller than the average pore diameter of the other sub-layers 10 which constitute the anode side gas diffusion layer 5 and the cathode side gas diffusion layer 4.

Incidentally, hereinafter, in a case where the average pore diameter of the sub-layer, which is in contact with the membrane electrode assembly 8, of the anode side gas diffusion layer 5 and the cathode side gas diffusion layer 4 is smaller than those of the other sub-layers, the sub-layer which is in contact with the membrane electrode assembly 8 may be sometimes referred to as "microporous layer (MPL)".

It is preferred that the MPL has a fine pore diameter distribution of 10 nm to 500 nm. In addition, the MPL may be a layer formed of fine carbon particles using polytetrafluoroethylene (PTFE) as a binder. Examples of the fine carbon particles include acetylene black, and ketjen black, and fibrous carbon and carbon nanotube formed by vapor phase deposition. Incidentally, the MPL may be subjected to water repellent treatment.

Further, as the other type of sub-layers, it is preferred to use a conductive carbon substrate having a fine pore diameter distribution of 500 nm to 100 μm, and more specifically, carbon cloth, carbon paper, carbon non-woven cloth, and the like which were subjected to water repellent treatment are preferably used.

Of the sub-layers which constitute the anode side gas diffusion layer 5 and the cathode side gas diffusion layer 4, for portions other than the MPL, carbon cloth, carbon paper, porous metal, or the like can be used, and those may be stacked to form a gas diffusion layer of a three-layer structure including the MPL. However, in a case where a metal material is used, it is preferred to use a conductive material having corrosion resistance such as oxidation resistance, and a sufficient mechanical strength. Specifically, SUS316L, a nickel chromium alloy, titanium, and the like are preferred. As the porous metal formed of a nickel chromium alloy, for example, Celmet (registered trademark; manufactured by Sumitomo Electric Toyama Co., Ltd.) can be preferably used.

Incidentally, in a case where the porous metal is used as the sub-layers to be used for a portion other than the MPL, the porous metal preferably has a continuous pore structure having a fine pore diameter distribution of 50 μm to 1 mm and a porosity of 70% to 99%.

EXAMPLES

In the following examples, a production method for a catalyst layer, and an example of a fuel cell using the catalyst layer formed by the production method for the catalyst layer are described in detail.

Example 1

This example is an example in which a first layer formed of a catalyst precursor and having a thickness of 1 μm and a second layer formed of the catalyst precursor and having a thickness of 1 μm are formed.

(Step 1)

As a substrate for transfer (hereinafter referred to as "transfer substrate"), a polytetrafluoroethylene (PTFE) sheet (manufactured by Nitto Denko Corp.) having a film thickness of 50 μm was used, and platinum oxide having a dendritic structure was formed in a thickness of 1 μm on the transfer substrate by a reactive sputtering process, whereby a layer formed of the platinum oxide and having the dendritic structure of 1 μm in thickness was obtained as a first layer including a catalyst precursor. The reactive sputtering was performed under the conditions of a total pressure of 5 Pa; an oxygen flow rate ratio (oxygen flow rate $(Q_{o2})$/(argon flow rate $(Q_{Ar})$+oxygen flow rate $(Q_{o2})$)) of 90%; and an RF (radio frequency) input power of 5.4 W/cm². Incidentally, it was confirmed by a thermometer that the substrate temperature at the time of the sputtering was 70° C.

(Step 2)

The first layer including the catalyst precursor obtained in the above-mentioned step was cooled by natural cooling to room temperature. After that, under the same sputtering conditions as mentioned above, platinum oxide was formed by a sputtering process on the surface of the first layer in a thickness of 1 μm, whereby a second layer including a catalyst precursor was formed.

(Step 3)

The catalyst precursor layer formed of the first layer and the second layer was subjected to a heat treatment at 120° C. for one hour and then impregnated with a mixed suspension solution of PTFE and Nafion, whereby an electrolyte channel was effectively formed on the surface of the catalyst precursor while conducting appropriate repellent treatment.

(Step 4)

On a PTFE sheet as a transfer layer to a polymer electrolyte membrane, a platinum-carrying carbon catalyst was formed by using a doctor blade. The catalyst slurry used in this step was a kneaded product of platinum-carrying carbon (HiSPEC 4000 (trade name); manufactured by Jhonson Matthey), Nafion, PTFE, IPA, and water. The Pt carrying amount at this time was 0.35 mg/cm².

(Step 5)

A solid polymer electrolyte membrane (Nafion 112 (trade name); manufactured by DuPont) was sandwiched between the catalyst precursor layer formed of oxide platinum and having the cracked first layer produced in the steps 1 to 3, and the catalyst layer formed of the mixture of the platinum-carrying carbon and Nafion formed in the step 4, and the resultant was subjected to hot pressing under the pressing conditions of 4 MPa and 150° C. for 1 minute.

By peeling the PTFE sheets, the pair of catalyst layers were transferred onto the polymer electrolyte membrane, and then the electrolyte membrane and the pair of catalyst precursor layer and catalyst layer were bonded together.

(Step 6)

The catalyst precursor layer obtained in the steps 1 to 3 of the thus bonded member was subjected to a reduction treatment to reduce the platinum oxide into platinum, thereby producing a membrane electrode assembly (MEA) constituted of the polymer electrolyte membrane and the pair of catalyst layers.

(Step 7)

Figure 3:
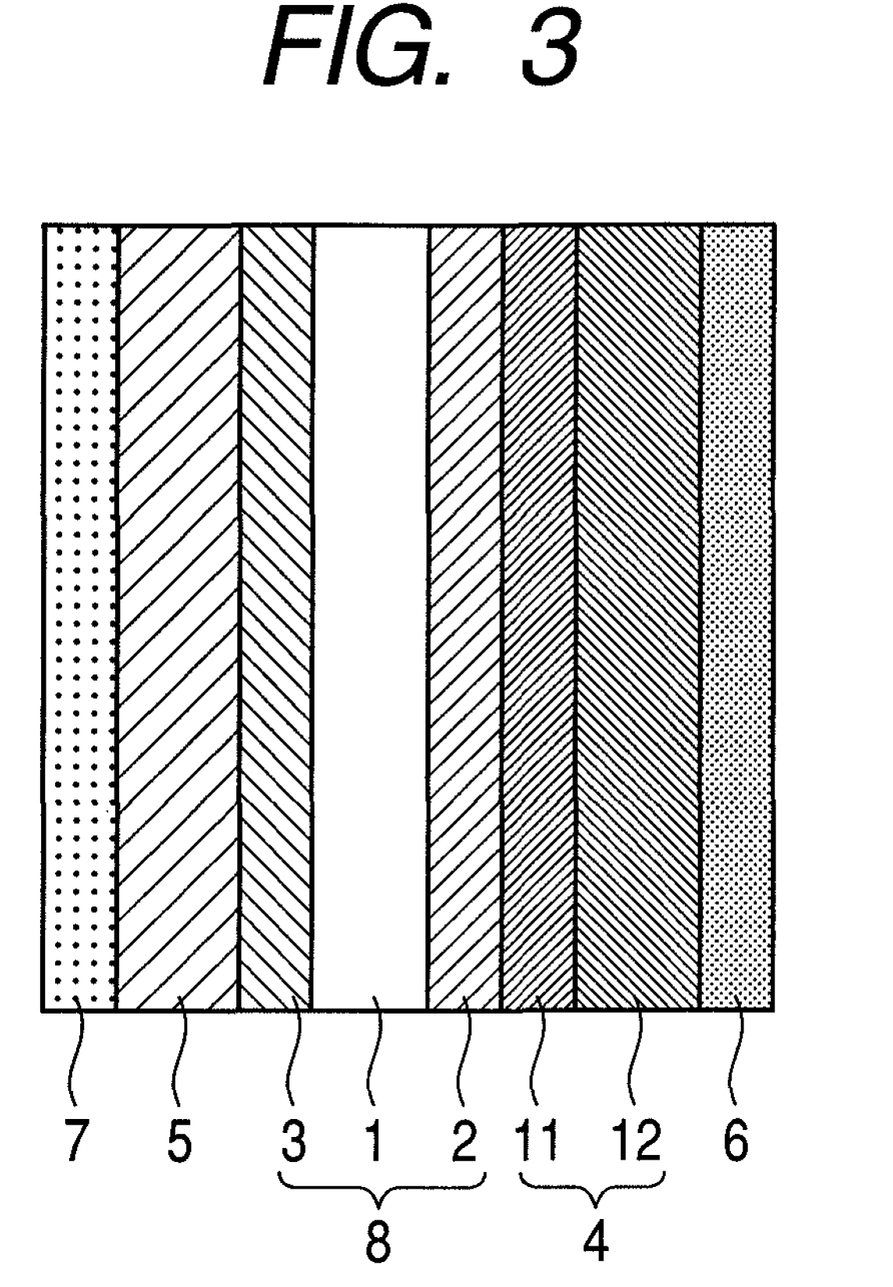
FIG. 3 is a schematic diagram illustrating a cross-sectional structure of still another example of a polymer electrolyte fuel cell using a catalyst layer of the present invention.

As illustrated in FIG. 3, the catalyst layer having the dendritic structure obtained in the steps 1 to 3 was disposed as the cathode side catalyst layer 2, and the platinum-carrying carbon catalyst layer obtained in the step 4 was disposed as the anode side catalyst layer 3. Further, as the anode side gas diffusion layer 5, carbon cloth (LT2500-W (trade name); manufactured by E-TEK) was disposed, and as the cathode side gas diffusion layer 4, a stack of carbon cloth (LT1200-W (trade name); manufactured by E-TEK) 11 and metal foam 12 (Celmet #5 (trade name); manufactured by Sumitomo Electric Toyama Co., Ltd.) was disposed. Furthermore, the cathode side collector 6 and the anode side collector 7 were disposed outside thereof to thereby complete the fuel cell unit.

The fuel cell unit produced by the above-mentioned steps was evaluated for its characteristics. The evaluation of the characteristics was carried out under the conditions of 25° C. in temperature and 50% in humidity, while the anode electrode was supplied with hydrogen gas and the cathode electrode was opened to atmosphere.

As Comparative Examples 1, a fuel cell unit was produced by following the same procedure as in Example 1 with the exception that a 2 µm thickness first layer was formed and the temperature thereof was returned to room temperature by natural cooling to thereby form a catalyst precursor layer, and the second layer was not formed.

Figure 4:
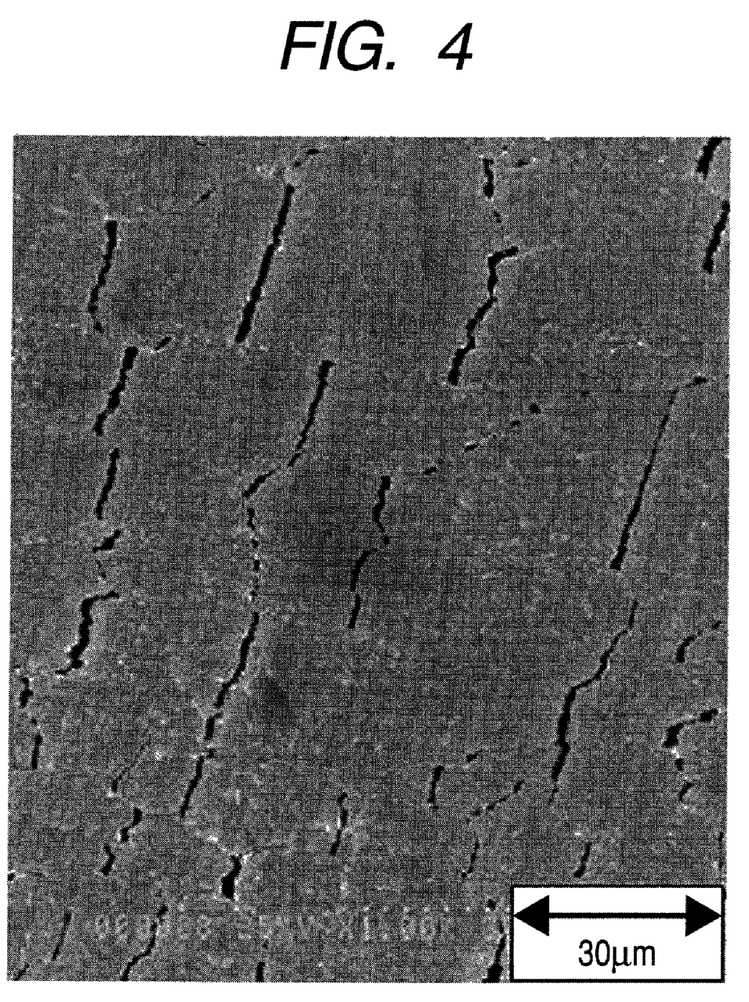
FIG. 4 is a scanning electron microscope (SEM) photograph of a dense layer of a catalyst layer precursor which was formed by sputtering in 1 μm thickness followed by cooling, and by further sputtering in 1 μm thickness in Example 1 of the present invention.
Figure 5:
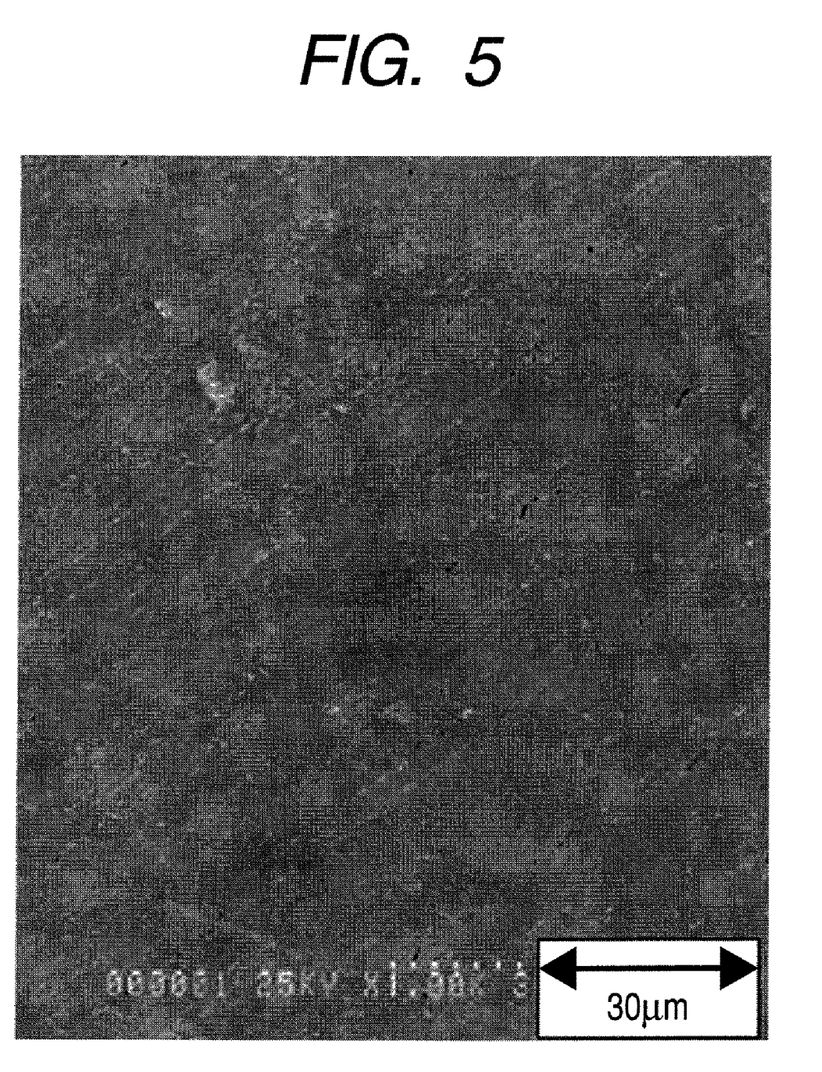
FIG. 5 is a scanning electron microscope (SEM) photograph of a dense layer of a catalyst layer precursor which was formed by sputtering in 2 μm thickness in Comparative Example 1 of the present invention.
Figure 6:
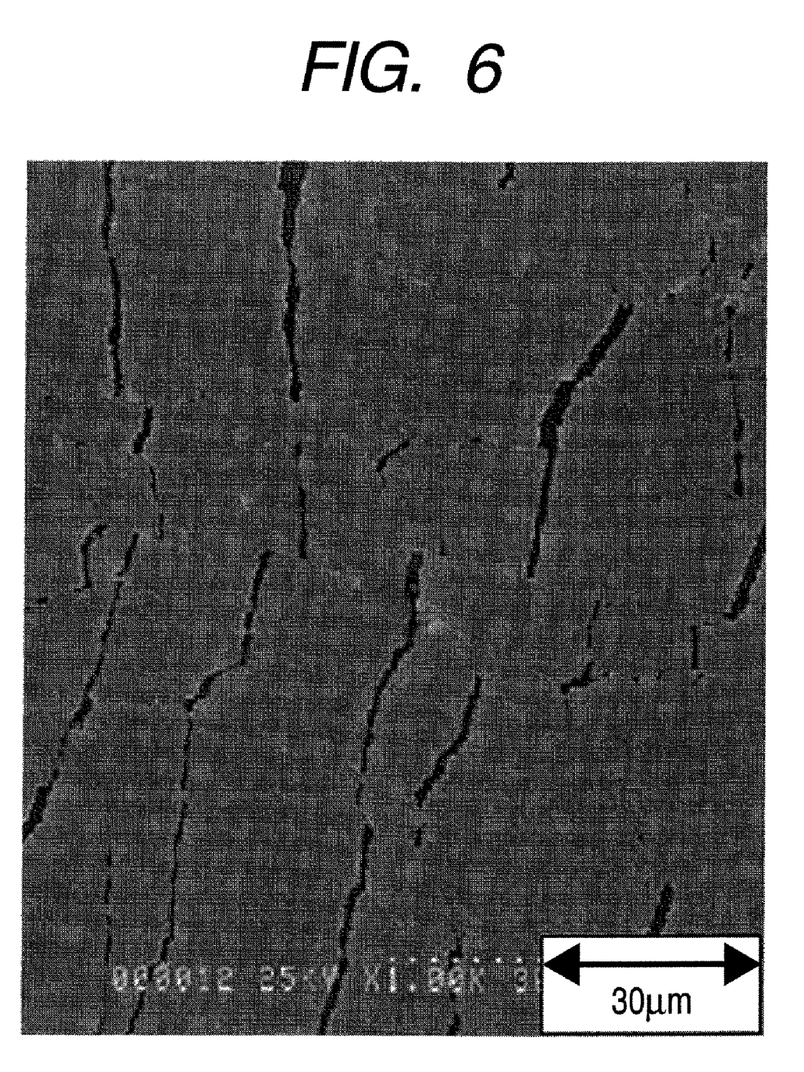
FIG. 6 is a scanning electron microscope (SEM) photograph of a dense layer of a catalyst layer precursor which was formed by sputtering in 1 μm thickness in Example 1 of the present invention.

FIG. 4 shows a scanning electron microscope (SEM) photograph of the catalyst precursor layer which was obtained by the formation of the 1 µm thickness first layer through sputtering, followed by natural cooling, and by further formation of the 1 µm thickness second layer through sputtering in Example 1. FIG. 5 shows an SEM photograph of the catalyst precursor layer which was obtained by the formation of the 2 µm thickness first layer through sputtering, followed by natural cooling in Comparative Example 1. FIG. 6 shows an SEM photograph of the catalyst precursor layer obtained in Example 1, at the stage at which the 1 µm thickness first layer was formed by sputtering and then cooled naturally in Example 1. These SEM photographs show images of the catalyst precursor layers after being transferred from the PTFE sheet (manufactured by Nitto Denko Corp.) to the polymer electrolyte membrane (Nafion 112 (trade name); manufactured by DuPont), and are observation results of the gas diffusion layer side surfaces of the transferred catalyst precursor layer, namely, the dense regions which are formed at the initial stage of the formation of the catalyst precursor layers. Incidentally, the catalyst precursor before being subjected to the reduction treatment is platinum oxide.

As shown in FIG. 5, cracks were not observed in the dense region of the catalyst precursor layer which was obtained by the formation of the 2 µm thickness first layer through sputtering, followed by natural cooling in Comparative Example 1. Specifically, the natural cooling does not work as a step of forming cracks with respect to the 2 µm thickness first layer. On the other hand, as shown in FIG. 4, cracks were observed in the dense region of the catalyst precursor layer which was obtained by the formation of the 1 µm thickness first layer through sputtering, followed by natural cooling, and by further formation of the 1 µm thickness second layer through sputtering in Example 1. Further, as shown in FIG. 6, cracks were observed in the dense region of the catalyst precursor layer obtained in Example 1, at the stage at which the 1 µm thickness first layer was formed by sputtering and then cooled naturally in Example 1, as with FIG. 4.

Figure 7:
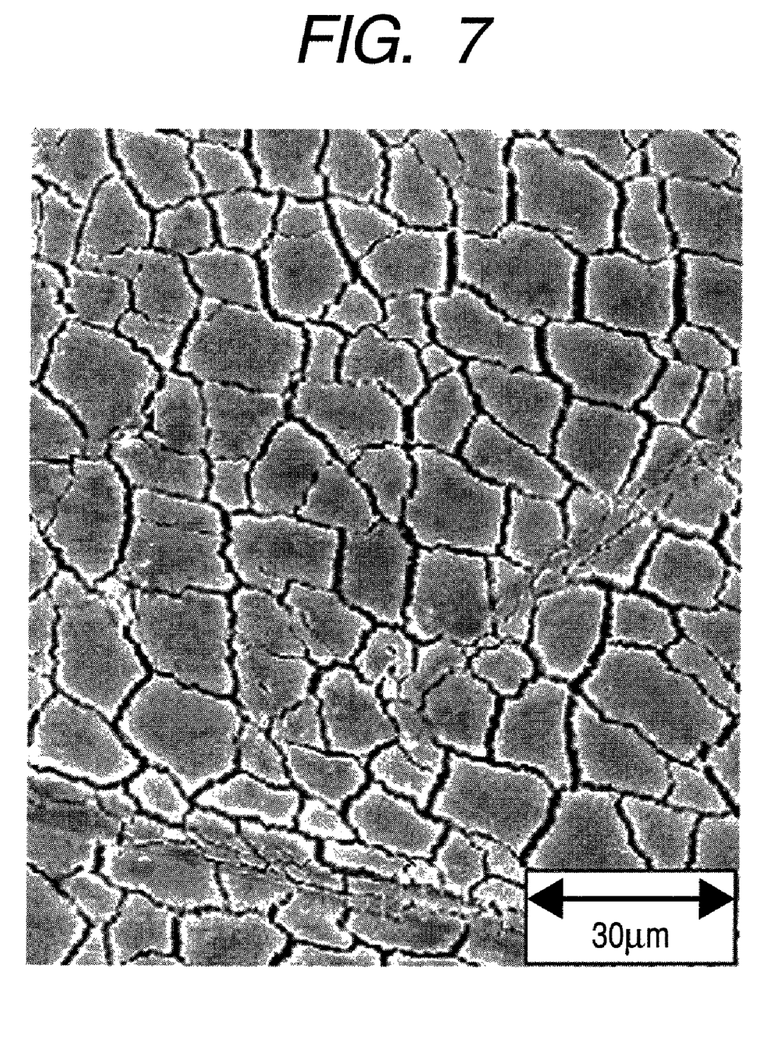
FIG. 7 is a scanning electron microscope (SEM) photograph of a dense layer of a catalyst layer which was formed by sputtering in 1 μm thickness followed by cooling, and by further sputtering in 1 μm thickness, and was then subjected to a reduction treatment in Example 1 of the present invention.
Figure 8:
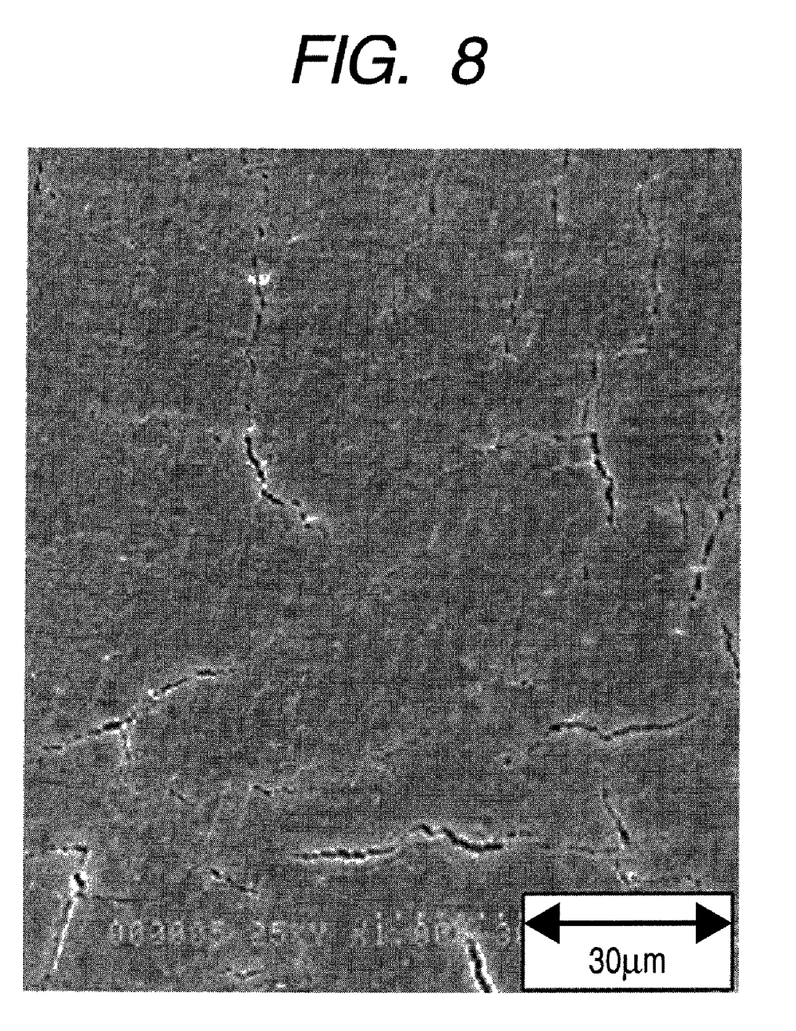
FIG. 8 is a scanning electron microscope (SEM) photograph of a dense layer of a catalyst layer which was formed by sputtering in 2 μm thickness, and was then subjected to a reduction treatment in Comparative Example 1 of the present invention.
Figure 9:
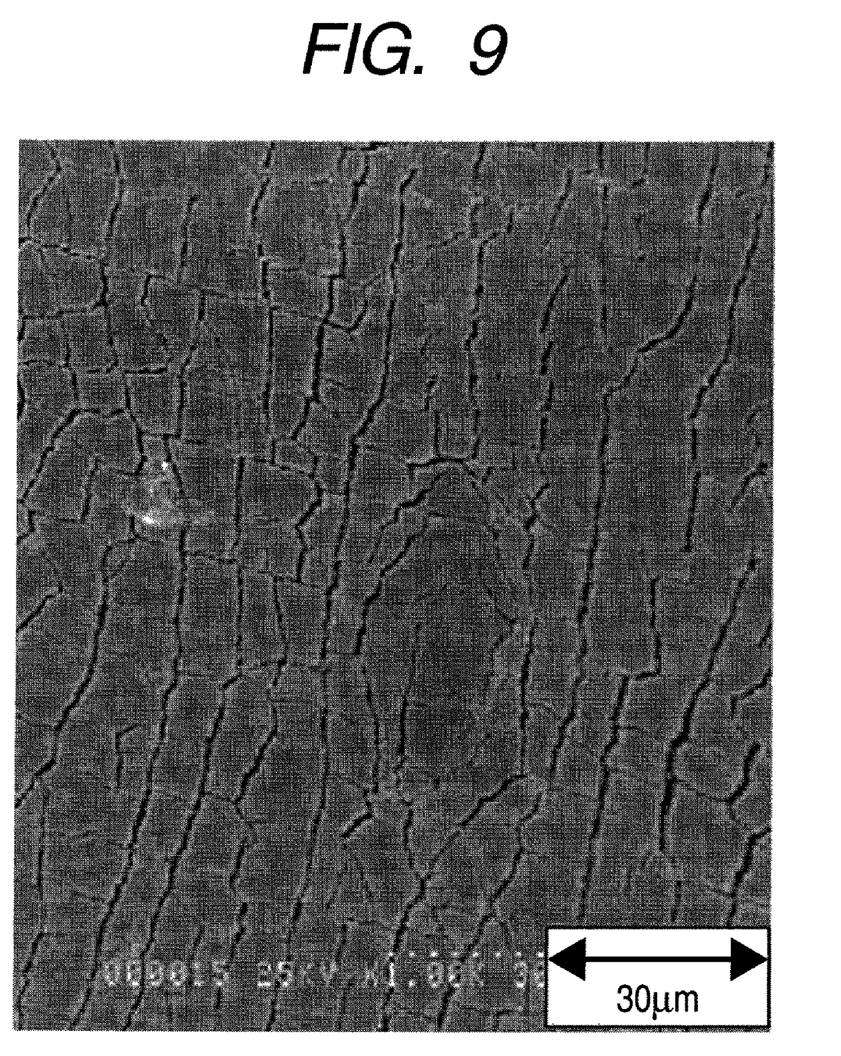
FIG. 9 is a scanning electron microscope (SEM) photograph of a dense layer of a catalyst layer which was formed by sputtering in 1 μm thickness, and was then subjected to a reduction treatment in Example 1 of the present invention.

Next, SEM photographs of the catalyst precursor layers after subjecting the catalyst precursor layers shown in FIGS. 4 to 6 to a reduction treatment and power generation operation are shown in FIGS. 7 to 9, respectively. As shown in FIG. 8, in the catalyst layer of Comparative Example 1, by reducing the dense region of the catalyst precursor layer where cracks were not formed, slight cracks only were formed in the dense region of the catalyst layer. On the other hand, as shown in FIG. 7, in the catalyst layer obtained by the reduction of the catalyst precursor layer which was obtained by the formation of the 1 µm thickness first layer through sputtering, followed by natural cooling, and by further formation of the 1 µm thickness second layer through sputtering in Example 1, the cracks were grown to form a large number of cracks. Further, as shown in FIG. 9, also in the catalyst layer obtained by the reduction of the catalyst precursor layer obtained in Example 1, at the stage at which the 1 µm thickness first layer was formed by sputtering and then cooled naturally in Example 1, the cracks were grown to form a large number of cracks.

It is considered that the large number of cracks were formed by a reaction accompanied by a large volume change such as reduction treatment or power generation with the cracks of the catalyst precursor layer formed before the reduction treatment being starting points.

It was confirmed from the above-mentioned results that in the dense region of each of the catalyst layer obtained by the reduction of the catalyst precursor layer which was obtained by the formation of the 1 µm thickness first layer through sputtering, followed by natural cooling, and by further formation of the 1 µm thickness second layer through sputtering in Example 1 and the catalyst layer obtained by the reduction of the catalyst precursor layer obtained in Example 1, at the stage at which the 1 µm thickness first layer was formed by sputtering and then cooled naturally in Example 1, there were a large number of cracks.

Figure 10:
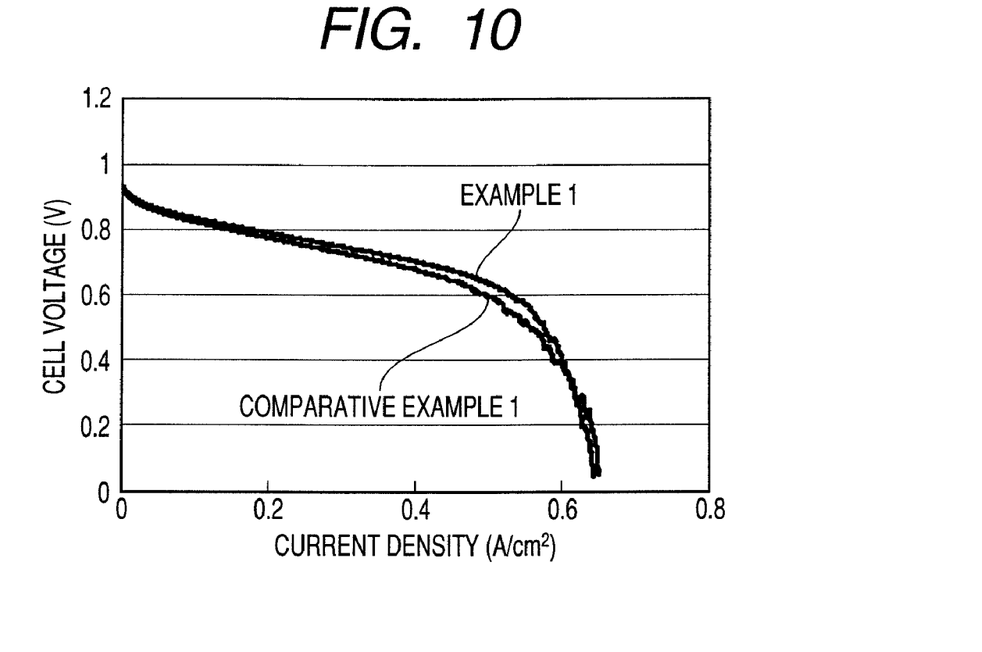
FIG. 10 is a graphical representation showing I-V curves for comparing the characteristics of the fuel cells according to Example 1 of the present invention and Comparative Example 1.

I-V curves for comparing the characteristics of the thus produced catalyst layers are shown in FIG. 10. As is seen from FIG. 10, the catalyst layer produced in Example 1 has higher characteristics than those of the catalyst layer produced in Comparative Example 1, and exhibits improvement in the characteristics of about 20 mV at 400 mA/cm$^2$. It can be seen from the results that by forming cracks in the first layer which is in the state of the catalyst precursor layer and then performing a reduction treatment, a catalyst layer having high catalyst activity and a high catalyst utilization efficiency can be obtained.

Example 2

This is an example of using a method which includes, after forming cracks in a first layer by etching, forming a second layer and forming cracks in the second layer by cooling, and then forming a third layer.

(Step i)

Platinum oxide was formed by a reactive sputtering process into a film in a thickness of 300 nm on a PTFE sheet having a thickness of 50 µm (manufactured by Nitto Denko Corp.) to thereby form a first sub-layer. Here, the reactive sputtering process was performed under the conditions of a total pressure of 5 Pa; an oxygen flow rate ratio ((oxygen flow rate ($Q_{o2}$)/(argon flow rate ($Q_{Ar}$)+oxygen flow rate ($Q_{o2}$))) of 90%; and an RF (radio frequency) input power of 5.4 W/cm$^2$.

(Step ii)

After that, as an etching step of the first sub-layer, the internal atmosphere of a vacuum chamber was replaced with an Ar atmosphere (0.67 Pa), an RF was input to the substrate at a power of 2.8 mW/cm$^2$, and etching was performed for 7 minutes.

(Step iii)

In addition, thereafter, a platinum oxide layer was formed in a thickness of 1 µm as a second sub-layer under the same conditions as in the step i, whereby a first layer having a dendritic structure was obtained.

(Step iv)

The first layer formed of the catalyst precursor obtained in the above-mentioned steps was cooled by natural cooling to room temperature. After that, under the same sputtering conditions as mentioned above, platinum oxide was sputtered on the surface of the first layer in a thickness of 1 µm to thereby form a second layer including a catalyst precursor, so that the catalyst precursor layer was completed.

(Step v)

The catalyst precursor layer formed of the first layer and the second layer was subjected to a heat treatment at 120° C. for one hour and then impregnated with a mixed suspension solution of PTFE and Nafion, whereby an electrolyte channel was effectively formed on the surface of the catalyst precursor while conducting appropriate repellent treatment.

(Step vi)

On a PTFE sheet as a transfer layer to a polymer electrolyte membrane, a platinum-carrying carbon catalyst was formed by using a doctor blade. The catalyst slurry used in this step was a kneaded product of platinum-carrying carbon (HiSPEC 4000 (trade name); manufactured by Jhonson Matthey), Nafion, PTFE, IPA, and water. The Pt carrying amount at this time was 0.35 mg/cm$^2$.

(Step vii)

A solid polymer electrolyte membrane (Nafion 112 (trade name); manufactured by DuPont) was sandwiched between the catalyst precursor layer formed of platinum oxide and having the cracked first layer produced in the steps i to v, and the catalyst layer formed of the mixture of the platinum-carrying carbon and Nafion formed in the step vi, and the resultant was subjected to hot pressing under the pressing conditions of 4 MPa and 150° C. for 1 minute.

By peeling the PTFE sheets, the pair of catalyst layers was transferred onto the polymer electrolyte membrane, and then the electrolyte membrane and the pair of catalyst precursor layer and catalyst layer were bonded together.

(Step viii)

The catalyst precursor layer obtained in the steps i to vi of the thus bonded member was subjected to a reduction treatment to reduce the platinum oxide into platinum, thereby producing a membrane electrode assembly (MEA) constituted of the polymer electrolyte membrane and the pair of catalyst layers.

(Step ix)

As illustrated in FIG. 3, the catalyst layer obtained by reducing the first layer obtained in the steps i to iii was disposed as the cathode side catalyst layer 2, and the platinum-carrying carbon catalyst layer obtained in the step iv was disposed as the anode side catalyst layer 3. Further, as the anode side gas diffusion layer 5, carbon cloth (LT2500-W (trade name); manufactured by E-TEK) was disposed, and as the cathode side gas diffusion layer 4, a stack of carbon cloth (LT1200-W (trade name); manufactured by E-TEK) 11 and metal foam 12 (Celmet #5 (trade name); manufactured by Sumitomo Electric Toyama Co., Ltd.) was disposed. Furthermore, the cathode side collector 6 and the anode side collector 7 were disposed outside thereof to thereby complete the fuel cell unit.

The single fuel cell unit produced by the above-mentioned steps was evaluated for its characteristics. The evaluation of the characteristics was carried out under the conditions of 25° C. in temperature and 50% in humidity, while the anode electrode was supplied with hydrogen gas and the cathode electrode was opened to atmosphere.

Figure 11:
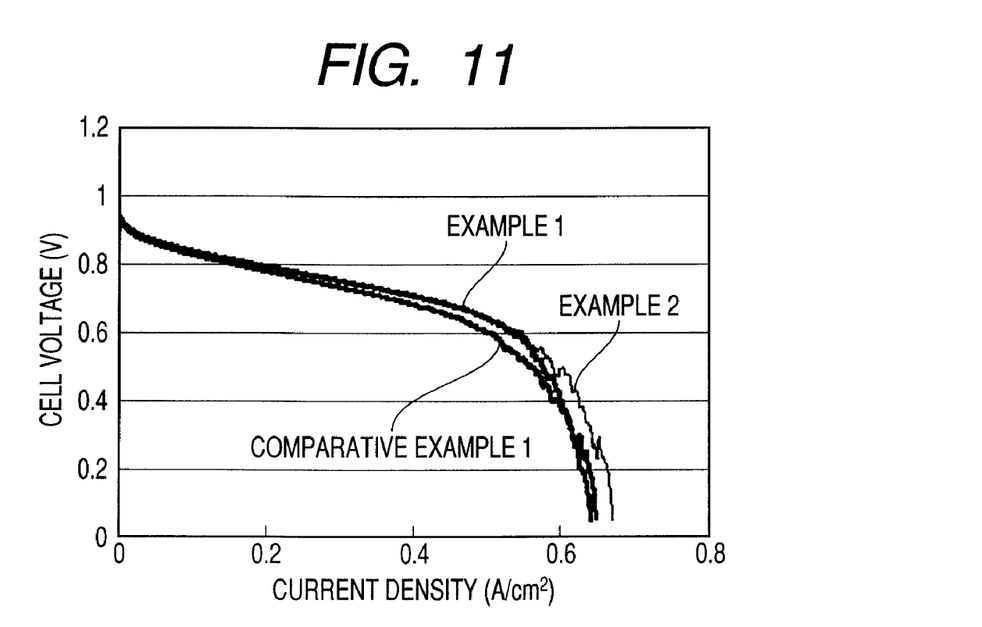
FIG. 11 is a graphical representation showing I-V curves for comparing the characteristics of the fuel cells according to Examples 1 and 2 of the present invention and Comparative Example 1.

FIG. 11 shows I-V curves of the catalyst layers obtained in Examples 1 and 2 and Comparative Example 1. The characteristics of the catalyst layer obtained in Example 2 are higher than those of the catalyst layer obtained in Comparative Example 1 as with Example 1, but are substantially the same as those of the catalyst layer obtained in Example 1.

Figure 12:
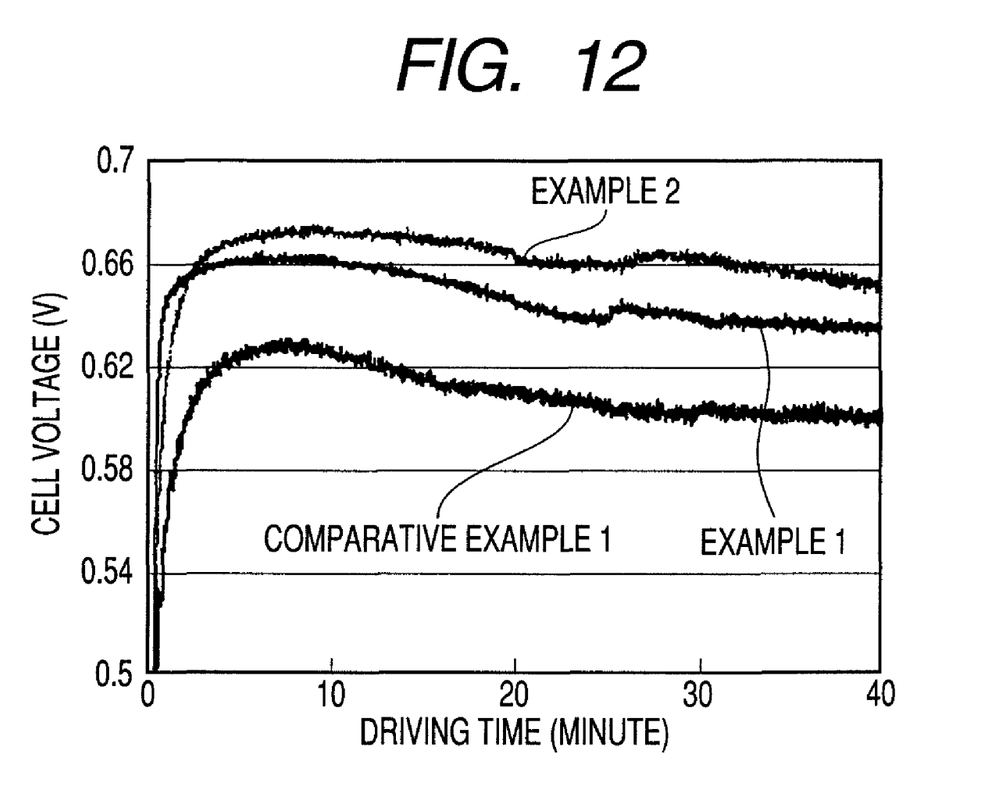
FIG. 12 is a graphical representation showing cell voltages when driven at a constant current of 400 mA/cm² for comparing the characteristics of the fuel cells according to Examples 1 and 2 of the present invention and Comparative Example 1.

Next, results of measurement at a constant current of 400 mA/cm$^2$ are shown in FIG. 12. As is seen from FIG. 12, the maximum voltages are substantially the same in Examples 1 and 2. This agrees with the result that the I-V curves for Examples 1 and 2 in FIG. 11 are substantially the same. However, in Example 1, the voltage was largely reduced with the elapse of the driving time. On the contrary, in Example 2, the reduction amount of the voltage was small, and a difference in performance of 30 mV was observed after 30 minutes driving. The reason is considered to be that by forming fine pores in the dense layer by etching, the water discharge ability was improved and the driving stability was improved. It can be seen from the results that by using etching and cooling in combination, it is possible to strike a balance between the improvement of the utilization efficiency of a catalyst layer and the improvement of the driving stability.

As described above, by using the catalyst layer according to this example as the catalyst layer of the polymer electrolyte fuel cell, the catalyst utilization efficiency can be remarkably improved, and the fuel cell having excellent cell characteristics can be provided.

According to the production method of a catalyst layer for a fuel cell of the present invention, by forming a recess including at least one of grooves, holes, and cracks in a catalyst layer formed by a dry vapor-phase process such as sputtering, a catalyst layer for a fuel cell can be obtained which has improved catalyst activity and catalyst utilization efficiency and can therefore be advantageously utilized for a fuel cell.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-262421, filed Oct. 5, 2007, which is hereby incorporated by reference in its entirety.

What is claimed is:

1. A method of producing a catalyst layer, comprising the steps of:
   forming a first layer comprising a catalyst precursor including platinum oxide or a composite oxide of platinum oxide and at least another metal element on a substrate by a vapor phase process;
   forming cracks in the first layer; and
   reducing the first layer having the cracks formed therein, wherein the first layer has a thickness of 1 µm or less.

2. The method of producing a catalyst layer according to claim 1, further comprising, between the step of forming the cracks and the step of reducing the first layer having the cracks formed therein, the step of forming a second layer comprising a catalyst precursor or a catalyst on a surface of the first layer.

3. The method of producing a catalyst layer according to claim 2, further comprising, between the step of forming the second layer and the step of reducing the first layer having the cracks formed therein, the step of forming cracks in the second layer, wherein the second layer comprises a catalyst precursor.

4. The method of producing a catalyst layer according to claim 3, wherein the step of forming the cracks in the second layer comprises cooling or ion etching the second layer.

5. The method of producing a catalyst layer according to claim 1, wherein the step of forming the cracks in the first layer comprises cooling or ion etching the first layer.

6. The method of producing a catalyst layer according to claim 1, wherein the first layer has a dendritic structure.

* * * * *